UNITED STATES PATENT OFFICE.

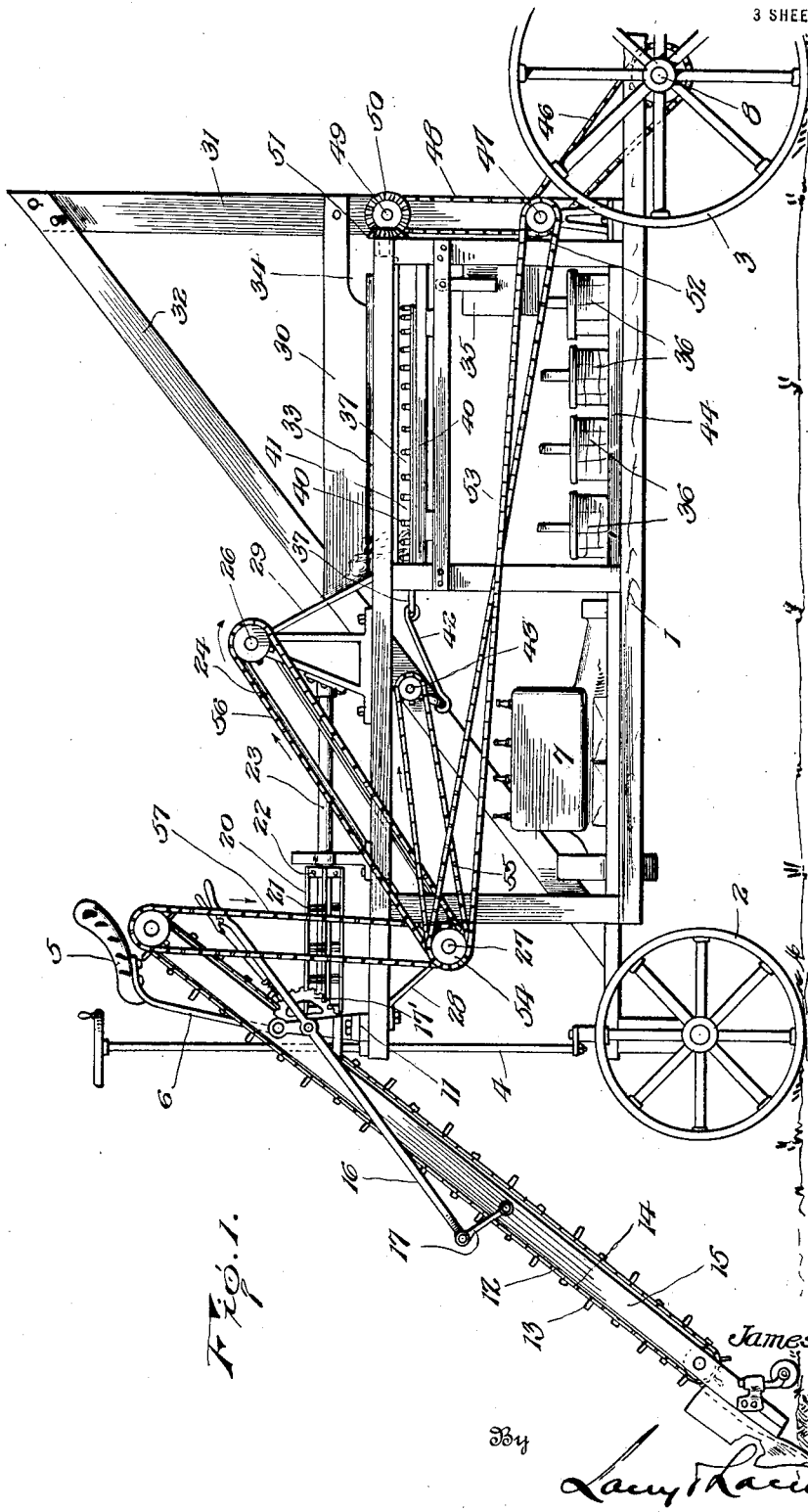

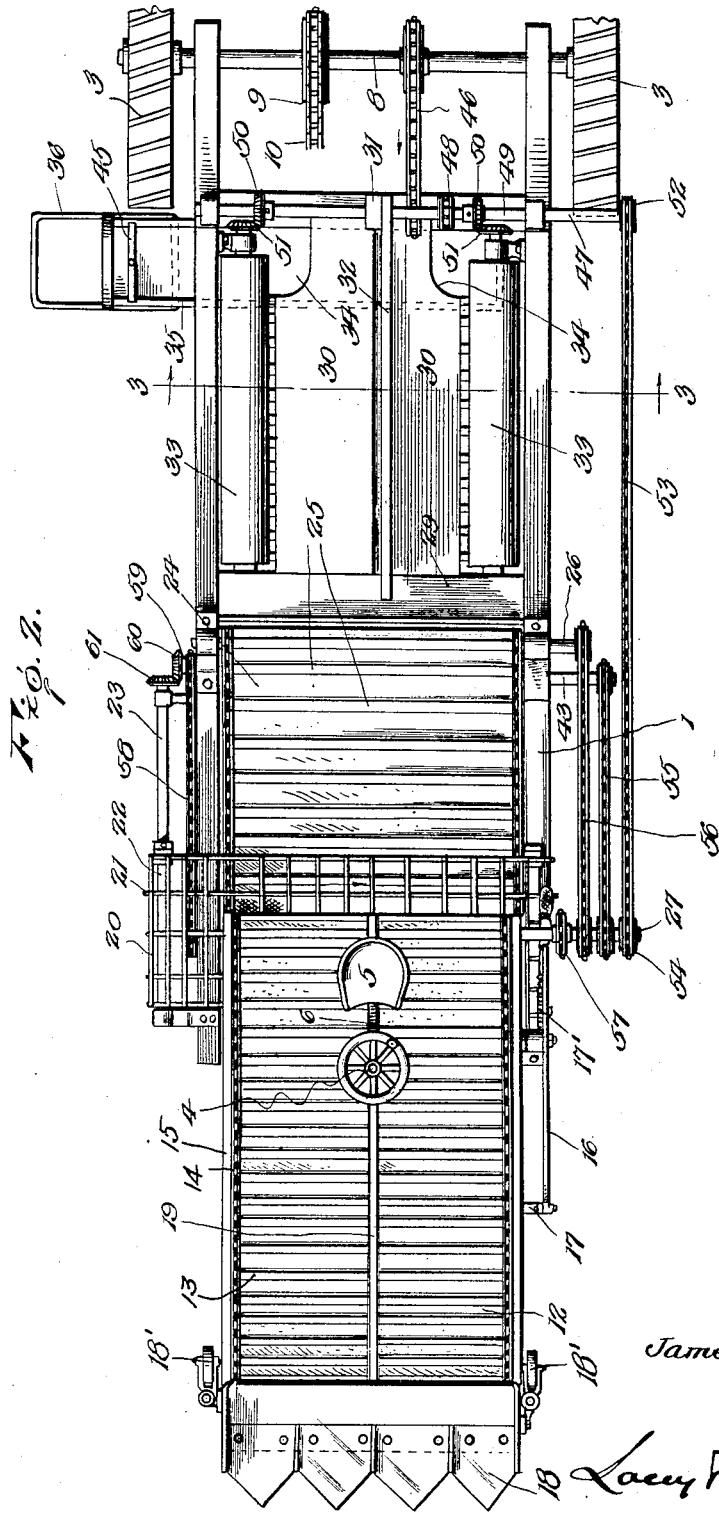

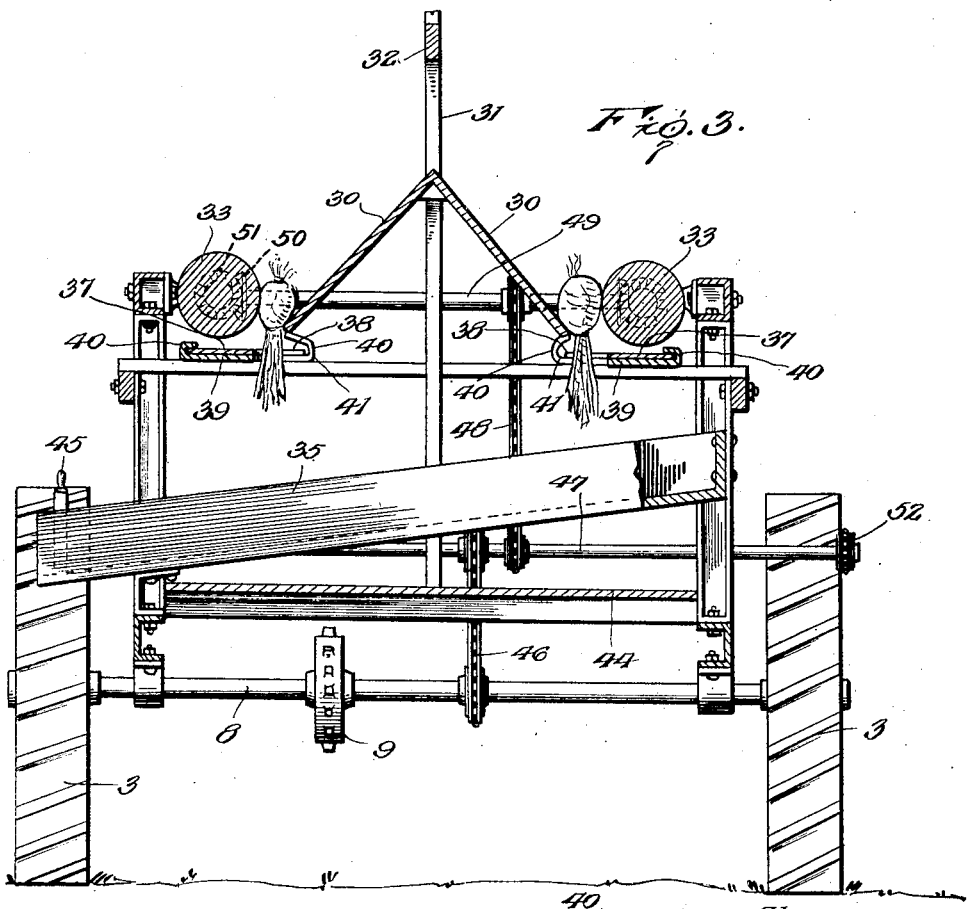
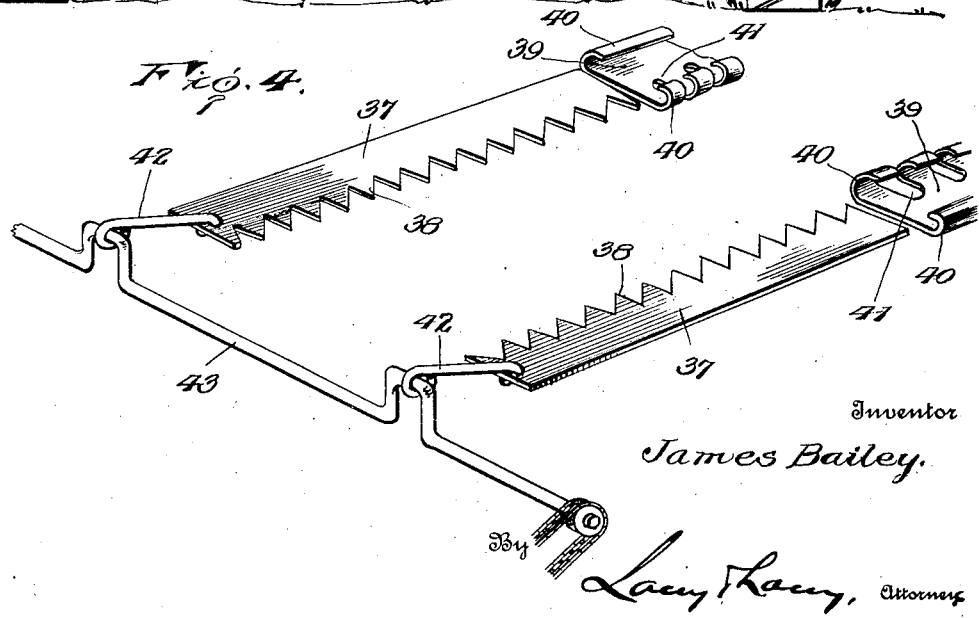

JAMES BAILEY, OF MARTEL, OHIO.

ONION-HARVESTER.

1,386,222.  Specification of Letters Patent.  Patented Aug. 2, 1921.

Application filed July 6, 1920. Serial No. 394,209.

*To all whom it may concern:*

Be it known that I, JAMES BAILEY, a citizen of the United States, residing at Martel, in the county of Marion and State of Ohio, have invented certain new and useful Improvements in Onion-Harvesters, of which the following is a specification.

My invention relates to machines for harvesting onions, beets or other vegetables of similar growth and has for its object the provision of a machine which will automatically remove the roots from the ground, separate the trash or weeds from the roots, and then sever the tops from the roots, the severed tops falling to the ground and the roots being deposited in a suitable receptacle.

The invention is illustrated in the accompanying drawings and will be hereinafter fully described, the novel features being subsequently particularly pointed out in the appended claims.

In the drawings—

Figure 1 is a side elevation of a machine embodying my improvements;

Fig. 2 is a plan view of the same;

Fig. 3 is a transverse section on the line 3—3 of Fig. 2;

Fig. 4 is a detail perspective view of the cutters whereby the tops are severed from the bodies or roots.

In carrying out the invention, I employ a frame 1 which will be constructed of sills and posts in an obvious manner and will be mounted upon wheels 2 and 3 whereby it may be readily moved over a field. The forward wheels 2 will be mounted for swinging movement and controlled by a steering rod 4 whereby the machine may be caused to follow a desired path. The steering rod will, of course, be accessible from a seat 5 carried by a standard 6 secured upon the front end of the main frame. The machine will be driven by any preferred motor 7 which is illustrated conventionally as an internal combustion engine and this motor will be operatively connected with the rear axle 8 carrying the rear wheels 3 in any preferred manner, a sprocket wheel 9 on the axle and a drive chain 10 trained around said sprocket wheel being indicated in Figs. 2 and 3.

Posts 11 are mounted upon the front end of the main frame 1 and upon these posts I support an elevator 12 which is preferably composed of two series of transverse slats 13 secured to and carried by parallel endless chains or cables 14 trained over suitable pulleys mounted in a frame 15. An adjusting lever 16 is fulcrumed upon one of the posts 11 where it may be conveniently manipulated by the operator upon the seat 5 and this lever is connected by a link 17 with the elevator frame, a rack 17' fixed on the post 11 coöperating with the usual latch on the lever to hold the lever and the elevator in a set position. At the lower forward end of the elevator, I secure the shovels or diggers 18 which are adapted to enter the ground and run below the surface of the same so that the onions will be uprooted and delivered onto the elevator by which they will be carried upwardly and rearwardly and discharged at the rear of the operator's seat. Casters 18' are also provided to aid in holding the diggers to work at a uniform depth. By referring to Fig. 2, it will be noticed that the seat standard 6 and the steering rod 4 extend through the longitudinal space 19 between the two series of slats constituting the elevator 12. This arrangement permits the elevator to be adjusted to any desired angle or to be raised entirely clear of the ground without any interference from the steering rod or the seat standard and at the same time permits said parts to be disposed on the central longitudinal line of the main frame.

Supported transversely upon the main frame, at the front end thereof and below the upper rear end of the elevator, is a weeder apron consisting of spaced bars or rods 20 carried by endless belts 21 trained over drums 22 suitably mounted at the sides of the main frame and driven by a shaft 23 as will be presently more particularly set forth. This weeder belt or apron is designed to deposit at one side of the machine the weeds and trash which may be taken up with the onions while permitting the onions to drop through and be carried to the severing and delivering mechanism. To this end, the transverse rods or bars 20 are spaced apart a sufficient distance to permit onions of the maximum diameter to drop between the same, but the longer vines and leaves which may be taken up with the onions will not be permitted to drop between the said rods or the cables 21 and will be carried thereby to the side of the machine and discharged onto the ground.

The onions dropping through the weeder belt or apron, as described, are caught by a conveyer 24 which may consist of an endless belt or apron having transverse slats 25 secured upon its outer surface and this apron is carried by an upper shaft 26 and a lower shaft 27, the upper shaft being suitably supported above the main frame in rear of the weeder belt, while the lower shaft 27 is supported below the said weeder belt, as clearly shown in Fig. 1. A deflector plate 28 is secured to and extends across the main frame and inclines downwardly and rearwardly to the said conveyer 24 so that the onions dropping through the weeder belt will not be permitted to fall to the ground but will be directed onto the conveyer and carried rearwardly by the same. Upon the top of the main frame, immediately adjacent the upper rear bight of the conveyer 24, is a deflector or guiding plate 29 which is disposed transversely of the main frame and is inclined downwardly and rearwardly from the conveyer, as clearly shown. Disposed longitudinally upon the top of the main frame and extending from the said deflector or guide 29 to the rear end of the frame are the guiding and separating plates 30 which are disposed at opposite sides of the longitudinal medial line of the machine and are supported by a post 31 at the rear end of the frame and a brace 32 extending from the upper end of said post to the front end of the main frame whereby a strong support for the said deflector and separators 30 is provided and rigidity imparted to the entire frame. The post 30 also supports a considerable portion of the driving mechanism as will presently more fully appear. Disposed longitudinally upon the main frame in spaced relation to the outer lower edges of the deflecting and separating plates 30 are rollers or drums 33 which rotate toward the respectively adjacent plates 30, as clearly shown in Fig. 3, and thereby serve to maintain the onions between themselves and the said plates. Moreover, the rotation of these rollers will roll the onions so that the tops carried thereby will be caused to depend into the paths of the cutters so that they may be readily severed from the bulbous bodies or roots. It will be also understood that the impact of the cutters against the onion tops will tend to feed the onions toward the rear end of the machine where the roots or bulbous bodies may fall through recesses or openings 34 in the plates 30 and drop into a transverse chute 35 whence they will be delivered into a basket 36 suspended on the outer end of said chute.

A cutter is provided below each plate 30 and the adjacent coöperating roller or drum 33 and each cutter consists of a reciprocatory knife 37 which is preferably provided with a plurality of teeth or cutting points 38 and is mounted in a guide 39 which is secured upon the main frame and may conveniently be in the form of a plate having overhanging flanges or beads 40 at its side edges to form guides for the reciprocatory knife. The overhanging flange at the inner edge of the guide plate is constructed with a plurality of transverse notches 41 to coöperate with the cutting teeth 38 and constitute abutments against which the tops may be caught and pressed by the cutting teeth in the severing operation. Each cutter 37 is connected at its forward end by a link 42 with a crank shaft 43 which is suitably mounted upon the main frame. It will be readily understood that as one basket 36 is filled it is removed from the chute and another basket hung on the chute, a supply of baskets being carried upon the platform 44 secured upon the main frame, preferably below the cutters, as shown. A gate or valve 45 may be provided in the outer end of the chute to control the discharge of the onions and prevent loss of the same.

All the working parts of the machine are driven from the rear axle and the illustrated arrangement for accomplishing this result comprises a sprocket chain gearing 46 connecting the rear axle with a transmission shaft 47 journaled in suitable bearings upon the rear end of the main frame, the said shaft being connected by sprocket gearing 48 with a countershaft 49 upon the top of the main frame at the rear end thereof, the standard 31 forming a part of the support for the transmission shaft 47 and the countershaft 49, as shown and as will be readily understood. Upon the countershaft 49, near the ends thereof, are secured beveled pinions 50 which are oppositely disposed and each of which meshes with a beveled pinion 51 on the rear end of the adjacent roller or drum 33. This train of gearing will cause the rollers or drums 33 to rotate toward the respectively adjacent plate 30 as will be readily understood. The transmission shaft 47 is extended to one side of the machine and upon said extended end is secured a sprocket 52 around which is trained a belt 53 which is also trained around a sprocket 54 on the extremity of the lower shaft 27 of the conveyer 24 and, as shown most clearly in Fig. 1, the chain 53 is crossed so as to impart the desired direction of movement to the said shaft 27. From the shaft 27, sprocket gearing 55 imparts motion to the crank shaft 43 while similar gearing 56 imparts motion to the shaft 26 to operate the conveyer 24. Similar gearing 57 connects the said shaft 27 with the upper shaft of the elevator 12 so that the cutters, the conveyer 24 and the elevator 12 are all driven directly from the said shaft 27. It will be also noted that the gearing 53, 55, 56 and 57 are all at one side of the machine. At the opposite side of the machine, sprocket gearing 58 connects the shaft 27 with a stub shaft 59 upon which is secured a beveled pinion 60 meshing with a similar pinion 61 on the rear end of the shaft 23 so that motion will be imparted to the weeder belt. It will thus be seen that I have provided a very compact driving mechanism in which every part is readily accessible if repairs or renewals should be necessary.

It is thought the operation of the machine will be readily understood from the foregoing description, taken in connection with the accompanying drawings. The shovels or diggers 18 are set to run at the desired depth in the ground and the machine is then driven along a row of plants. As the machine advances, the bulbs will be uprooted by the diggers and will ride up the same onto the elevators 12 which will carry them upwardly and deliver them onto the weeder belt. As the weeder belt moves transversely with respect to the machine, the weeds and trash will be separated from the bulbs and will be discharged onto the ground at the side of the machine, the bulbs dropping through the weeder belt and being caught by the conveyer 24 or falling onto the deflector 28 and then in turn directed onto the conveyer. The conveyer will obviously carry the onions upwardly and rearwardly and deliver them onto the deflecting plate 29 down which they will roll to the plates 30 and will then be directed laterally toward the rollers or drums 33. The rotation of the said rollers or drums will cause the onions to roll and the tops still connected with the bulbs will be presented downwardly and will be caught by the notches 41 and severed by the cutters 38 working across the said notches. The tops will, of course, fall through the main frame and the onions will be caused to move to the rear ends of the plates 30 and fall into the chute as previously set forth.

The machine is very compact in its arrangement and will effectually uproot the bulbs and separate the same from the trash or weeds and deliver them into the baskets provided to receive them after the tops have been severed without any attention being required normally from the operator.

Having thus described the invention, what is claimed as new is:

1. An onion harvester comprising uprooting means, an elevator arranged to receive the onions from the uprooting means, a belt disposed adjacent the rear end of the elevator to receive the onions and trash from the elevator, said belt comprising members spaced apart to permit onions to drop therethrough but prevent the passage of trash, cutters disposed in rear of said endless belt to sever tops from the onions, and means for conveying the onions with the tops from the said endless belt and delivering them to the cutters.

2. An onion harvester comprising uprooting means, an elevator arranged to receive the onions from said uprooting means, a mechanism for receiving the onions from the said elevator and separating the weeds and trash from the onions, a conveyer disposed in rear and partly below said separating mechanism, a deflector disposed below said mechanism and extending to said conveyer, and means in rear of and below the conveyer to sever tops from the onions.

3. An onion harvester comprising uprooting means, and means for carrying the onions from the uprooting means, longitudinally disposed cutters in rear of the said conveying means, a deflector leading from said conveying means to the cutters, and means for causing the onions to present the tops to the cutter.

4. An onion harvester comprising uprooting means, means for receiving the onions from said uprooting means and conveying them rearwardly, a roller disposed in rear of the said conveying means and arranged longitudinally, a deflector disposed parallel with said roller and spaced therefrom, the onions with attached tops being delivered by the conveying mechanism to the said deflector and roller, and cutting mechanism disposed below said roller to sever the tops from the onions.

5. An onion harvester comprising uprooting means, means for conveying the onions from the uprooting means, a cutting mechanism disposed in rear of said conveying means and consisting of a transversely notched guide and a reciprocatory cutter moving in the guide and across the transverse notches of the same, and means for receiving the onions from the conveying mechanism and causing them to present the tops to the said reciprocating cutters.

In testimony whereof I affix my signature.

JAMES BAILEY. [L. S.]